US008223623B2

(12) United States Patent
Wang (10) Patent No.: US 8,223,623 B2
(45) Date of Patent: Jul. 17, 2012

(54) TIMING AND FREQUENCY ACQUISITION FOR OFDM SYSTEMS

(75) Inventor: Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1727 days.

(21) Appl. No.: 11/449,945

(22) Filed: Jun. 9, 2006

(65) Prior Publication Data

US 2007/0286065 A1 Dec. 13, 2007

Related U.S. Application Data

(63) Continuation-in-part of application No. 11/390,623, filed on Mar. 27, 2006, now abandoned.

(60) Provisional application No. 60/666,277, filed on Mar. 28, 2005.

(51) Int. Cl.
*H04J 11/00* (2006.01)
(52) U.S. Cl. ......... 370/208; 370/244; 370/310; 370/343
(58) Field of Classification Search .................. 370/208, 370/260, 132, 244, 310, 343, 350, 464, 480
See application file for complete search history.

(56) References Cited

U.S. PATENT DOCUMENTS

| | | | | |
|---|---|---|---|---|
| 5,276,706 A * | 1/1994 | Critchlow | ............ | 375/343 |
| 5,619,542 A * | 4/1997 | Gurney et al. | ............ | 375/371 |
| 6,459,745 B1 * | 10/2002 | Moose et al. | ............ | 375/355 |
| 7,099,353 B2 * | 8/2006 | Hosur | ............ | 370/510 |
| 7,315,566 B2 * | 1/2008 | Tanno et al. | ............ | 375/142 |
| 7,532,693 B1 * | 5/2009 | Narasimhan | ............ | 375/355 |
| 7,583,728 B2 * | 9/2009 | Chen et al. | ............ | 375/229 |
| 7,756,005 B2 * | 7/2010 | Murthy et al. | ............ | 370/208 |
| 7,920,658 B2 * | 4/2011 | Gupta | ............ | 375/344 |
| 2003/0072256 A1 * | 4/2003 | Kim | ............ | 370/208 |
| 2004/0004933 A1 * | 1/2004 | Zhu et al. | ............ | 370/203 |
| 2004/0146126 A1 * | 7/2004 | Wheatley et al. | ............ | 375/343 |
| 2005/0063298 A1 * | 3/2005 | Ling et al. | ............ | 370/208 |
| 2005/0163265 A1 * | 7/2005 | Gupta | ............ | 375/343 |
| 2005/0165949 A1 * | 7/2005 | Teague | ............ | 709/236 |
| 2006/0018413 A1 * | 1/2006 | Gupta | ............ | 375/343 |
| 2006/0126670 A1 * | 6/2006 | Jeon et al. | ............ | 370/503 |
| 2006/0159207 A1 * | 7/2006 | Wagner et al. | ............ | 375/344 |
| 2007/0104261 A1 * | 5/2007 | He et al. | ............ | 375/229 |

OTHER PUBLICATIONS

Milos et al; ("Optimized low-power synchronizer design to the IEEE 802.11a standard") 2003; IEE; pp. 333-336.*

* cited by examiner

*Primary Examiner* — Ricky Ngo
*Assistant Examiner* — Dewanda Samuel
(74) *Attorney, Agent, or Firm* — Stanton Braden (57) ABSTRACT

Systems and methods are provided for processing Time Domain Multiplexing Pilot symbols by employing complex accumulators to determine peak values which indicate the start of timing and frequency information. In an embodiment, a method is provided for timing acquisition in a wireless network. The method includes acquiring samples from an Orthogonal Frequency Division Multiplexing (OFDM) data packet over a predetermined period of time, where the samples include one or more TDM pilot symbols. The samples are then processed to determine a maximum value that indicates the TDM pilot symbol has been detected.

48 Claims, 10 Drawing Sheets

TIMING AND FREQUENCY ACQUISITION FOR OFDM SYSTEMS

CROSS REFERENCE TO RELATED APPLICATION

This application is a continuation-in-part of and claims priority to U.S. Patent application Ser. No. 11/390,623 filed Mar. 27, 2006 now abandoned, entitled "Optimal Timing and Frequency Acquisition for OFDM Systems," which claims the benefit of priority to U.S. Provisional Patent Application Ser. No. 60/666,277 filed on Mar. 28, 2005, entitled "Optimal timing and frequency acquisition" the entire contents of which is incorporated herein by reference.

BACKGROUND

I. Field

The subject technology relates generally to communications systems and methods, and more particularly to systems and methods that determine timing and frequency information in an OFDM system by applying matched filtering functions to detect received pilot symbols, where complex outputs are acquired over a time period and sampled to determine timing and frequency information.

II. Background

An air interface specification defines FLO (Forward Link Only) technology that has been developed by an industry-led group of wireless providers. The basic signal unit for FLO™ transmission is an Orthogonal Frequency Division Multiplexing (OFDM) symbol that consists of 4642 time-domain base-band samples called OFDM chips. Among these OFDM chips are 4096 data chips. The data chips are cyclically extended on each side, with 529 cyclically extended chips preceding the data portion and 17 following the data portion. To reduce the OFDM signal's out-band energy, the first 17 chips and the last 17 chips in an OFDM symbol have a raised cosine envelope. The first 17 chips of an OFDM symbol overlap with the last 17 chips of the OFDM symbol that precede them. As a result, the time duration of each OFDM symbol is 4625 chips long.

Before transmission, FLO data is generally organized into super frames. Each super frame has one second duration. A super frame generally consists of 1200 symbols (or variable number of OFDM symbols based on the bandwidth being used) that are OFDM modulated with 4096 sub-carriers. Among the 1200 OFDM symbols in a super frame, there are: Two TDM pilot symbols (TDM1, TDM2); One wide-area and 1 local identification channel (WIC and LIC) symbols; Fourteen OIS channel symbols, including four Transitional Pilot Channel (TPC) symbols; A variable number of two, six, 10, or 14 PPC symbols for assisting with position location; and Four data frames.

Time Division Multiplexing (TDM) Pilot Symbol 1 (TDM1) is the first OFDM symbol of each super frame, where TDM1 is periodic and has a 128 OFDM chip period. The receiver uses TDM1 for frame synchronization and initial time (course timing) and frequency acquisition. Following TDM1, are two symbols that carry the wide-area and local IDs, respectively. The receiver uses this information to perform proper descrambling operations utilizing the corresponding PN sequences. Time division Multiplexing pilot Symbol 2 (TDM2) follows the wide-area and local ID symbols, where TDM2 is periodic, having a 2048 OFDM chip period, and contains two and a fraction periods. The receiver uses TDM2 when determining accurate timing for demodulation.

Following TDM2 are: One wide-area TPC (WTPC) symbol; Five wide-area OIS symbols; Another WTPC; One local TPC (LTPC) symbol; Five local OIS symbols; Another LTPC; and Four data frames follow the first 18 OFDM symbols described above. A data frame is subdivided into a wide-area data portion and a local data portion. The wide-area Data is pre-pended and appended with the wide-area TPC—one on each end. This arrangement is also used for the local data portion. One important aspect is the initial processing of super frame information in order to determine such aspects as the start of a new super frame such that further frame information can be synchronized and determined there from.

There are several problems that are related with conventional pure delayed autocorrelation based timing and frequency acquisition systems. One problem relates to the fact that timing acquisition uses a fixed threshold directly on the delayed correlation estimate to detect a rising and trailing edge of a delayed autocorrelation estimate calculated directly from a hypothesized TDM Pilot 1 waveform. This method suffers from the sensitivity to the variation of noise/interference level such as caused by a tone jammer. There are other variations of the pure autocorrelation based methods which have similar limitations. Another problem is that current frequency acquisition algorithms update a frequency offset during the coarse timing acquisition period which results in at least two drawbacks: First, it impairs the correlation used for timing acquisition; second, it provides degraded frequency estimate which may cause acquisition failure. Another problem relates to large detection delays of conventional systems, resulting in the potential missed processing of the next OFDM symbol.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for determining timing and frequency information in an Orthogonal Frequency Division Multiplexing (OFDM) system. In general, one technique that has been employed to detect pilot information in a received OFDM packet has been to employ thresholds to detect peak signals that indicate the start of the respective packet. Thresholds may be susceptible to noise however. In an aspect, the subject technology employs a template that matches an ideal delayed correlation function of a TDM Pilot I waveform to correlate with estimated correlation data over a given period of time. Since the pilot generally only occurs once in the respective time period, the position where the maximum output from a matched filter corresponds to the TDM Pilot I position can be determined by computing peak or maximum data values during the time period. For example, samples can be acquired at a receiver and stored in an accumulator. Computations can be applied to the accumulator to determine maximum values that have occurred during a time period and over a given set of samples. From these maximum values, timing and frequency considerations can then established for the receiver.

By utilizing maximum value computations and samples as in contrast to threshold measurements, this approach can be more robust in terms of noise and interference resistance. In another aspect, decisions can be made where the type of detection can be selected. For instance, in one case, accumulator methods are applied to determine maximum values and thus detection of the pilot symbol. In another instance, threshold methods could be employed for low noise situations and/or for reduced delay in determining system timing and frequency information.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided for processing Time Domain Multiplexing Pilot symbols by employing complex accumulators to determine peak values which indicate the start of timing and frequency information. In an embodiment, a method is provided for timing acquisition in a wireless network. The method includes acquiring samples from an Orthogonal Frequency Division Multiplexing (OFDM) data packet over a predetermined period of time, where the samples include one or more TDM pilot symbols. The samples are then processed to determine a maximum value that indicates the TDM pilot symbol has been detected.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
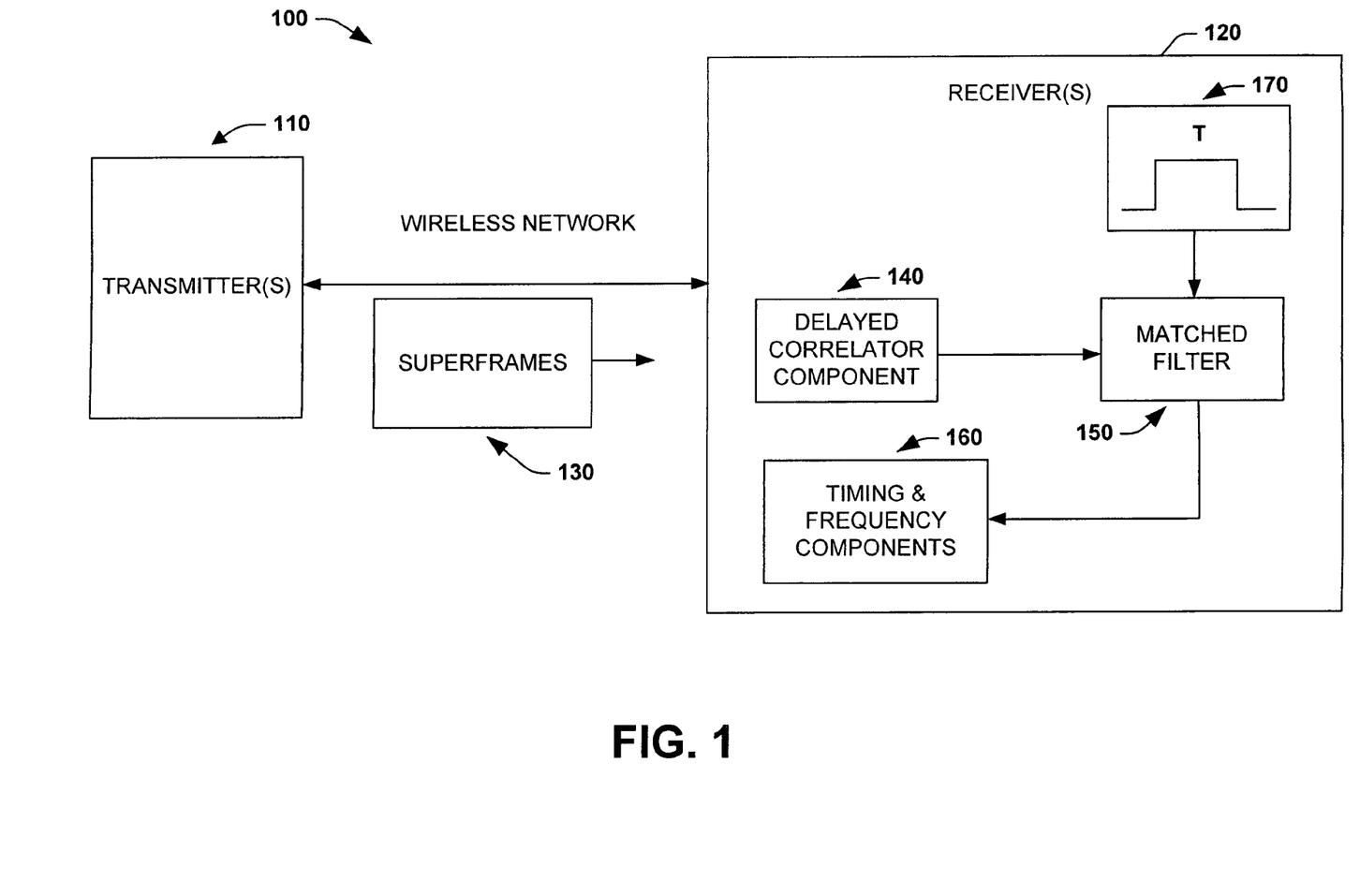
FIG. 1 is a schematic block diagram illustrating timing and frequency processing components for a wireless receiver.

FIG. 1 illustrates timing and frequency processing components for a wireless system 100. The system 100 includes one or more transmitters 110 that communicate across a wireless network to one or more receivers 120. The receivers 120 can include substantially any type of communicating device such as a cell phone, computer, personal assistant, hand held or laptop devices, and so forth. Portions of the receiver 120 are employed to decode and process a super frame 130 and other data such as multimedia data. The super frame 130 is generally transmitted in an Orthogonal Frequency Division Multiplexing (OFDM) network that can also employ forward link only (FLO) protocols for multimedia data transfer. The superframe 130 generally includes a Time Division Multiplexing Pilot 1 symbol (not shown) that is employed for timing and frequency acquisition in the receiver 120. A delayed correlator component 140 in the receiver 120 processes the super frame 130 to detect a TDM1 OFDM symbol in accordance with a matched filter 150, where it is noted that TDM1 and TDM Pilot 1 are equivalent terms.

The matched filter 150 is employed to process the delayed correlator 140 output in the receiver 120 with a correlation function 170. Output from the matched filter 160 can be monitored and processed according to several methods to determine timing and frequency information from received pilot OFDM symbols in the superframe 130. In an aspect, an edge template can be employed as the correlation function 170 and applied to the delayed correlator output in the matched filter 150, where the matched filter generally applies a differentiation on the delayed correlator output so that the output has less dependency on the noise/interference level. Timing and frequency components 160 receive output from the matched filter in order to synchronize with the transmitters 110 via the received pilot information in the superframe 130.

In general, the matched filter 150 includes complex accumulators that store magnitude information collected from the superframe 130. Such information includes real and imaginary components that are processed in the filter to determine magnitude values (e.g., square root of the sum of the squares). By determining such magnitudes over a given time period (e.g., 1 second), the given peak magnitude can be determined from the accumulators and equated to a detected pilot symbol. For instance, a buffer of 1000 magnitude samples can be analyzed to determine the peak value and the location of such value in the buffer is employed to determine timing and frequency offsets for the receiver 120. In an aspect, the system 100 includes a component 120 for determining timing data in a wireless network. This includes means for analyzing a superframe to determine a delayed output signal (e.g., delayed correlator 140), means for generating a correlation function (e.g., timing components 160); and means for filtering (e.g., matched filter 150) the delayed output signal to determine a peak magnitude value that indicates timing or frequency information.

Figure 2:
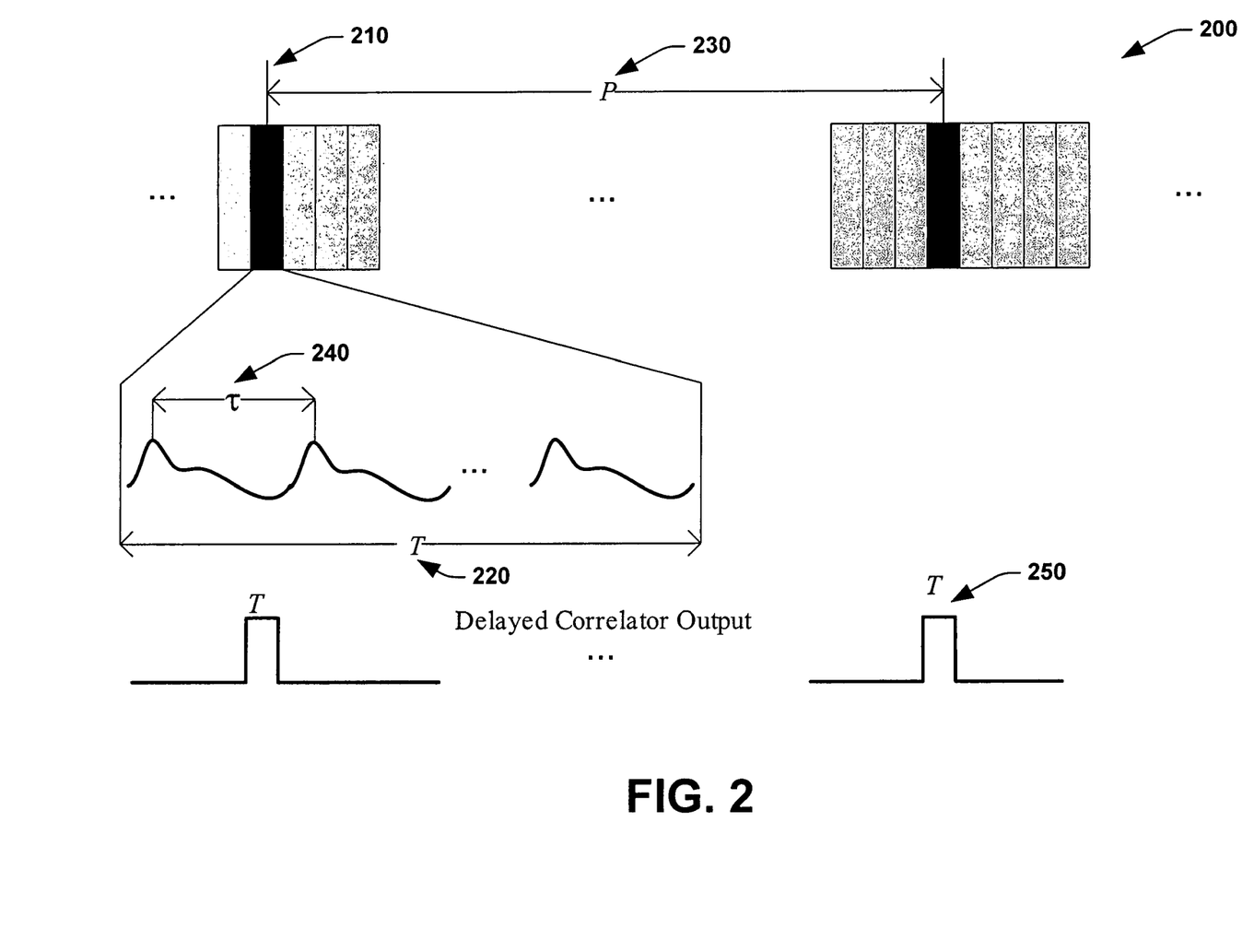
FIG. 2 illustrates an example timing and signal diagram.

Referring briefly to FIG. 2, a timing and signal diagram 200 is illustrated. At 210, a TDM pilot symbol is transmitted. In many OFDM communication systems, the receiver initial time and frequency is performed by acquiring a special pilot OFDM symbol 210 with duration T as shown at 220 that is transmitted periodically with period P as shown at 230. The special pilot 210 includes a sequence of periodic waveforms in time domain with period $\tau$, as shown at 240. A delayed correlator with delay $\tau$ is generally used to detect this periodicity. The output is generally a series of rectangular pulses as depicted in at 250 of FIG. 2. The task of a receiver is to use this feature to robustly acquire the timing and frequency offset.

Referring back to FIG. 1, the receiver 120 uses the template 170 that matches the ideal delayed correlation function of the TDM Pilot I waveform to correlate with the estimated correlation data over the period of T as shown at 220 of FIG. 2. Since the pilot only occurs once in time period T, the position that the maximum output from the matched filter 150 corresponds to the pilot I position is determined. The timing is then established. This approach is robust in terms of noise and interference resistance since thresholds are not being employed to detect position of the pilot.

Before proceeding, it is noted that several methods can be employed to process output from the delayed correlator 140. In one method, a template can be employed at 170 that matches the ideal delayed correlation function of the TDM Pilot 1 waveform to correlate with the estimated correlation data over the entire period of superframe 130 (e.g., one second) where the maximum correlation corresponds the TDM Pilot 1 position. During such periods, accumulator values can be acquired and magnitudes determined as described above. For lower complexity and smaller delays, an alternative edge detection algorithm can be employed where thresholds are applied to detect peak waveforms.

Before proceeding it is noted that a peak detector (not shown) can employ substantially any method for detecting the highest received output from the matched filter 150. This could employ utilizing known peak detector circuits or employing a variable threshold, where a new threshold is established each time a new highest peak is detected or established. Also, more the one sample can be employed to determine whether or not the highest peak has been obtained such as a sample subset employed to determine the average highest peak. As can be appreciated, combination approaches can be employed. In some applications, threshold methods can be utilized (e.g., low noise, low delay). In other applications, magnitude computations can be employed, where peak magnitude computations indicate the pilot signal. In an alternative aspect, dynamic adjustments can be made, (e.g., user adjustment), where threshold methods or magnitude methods can be selected and subsequently employed for setting timing and frequency information.

Figure 3:
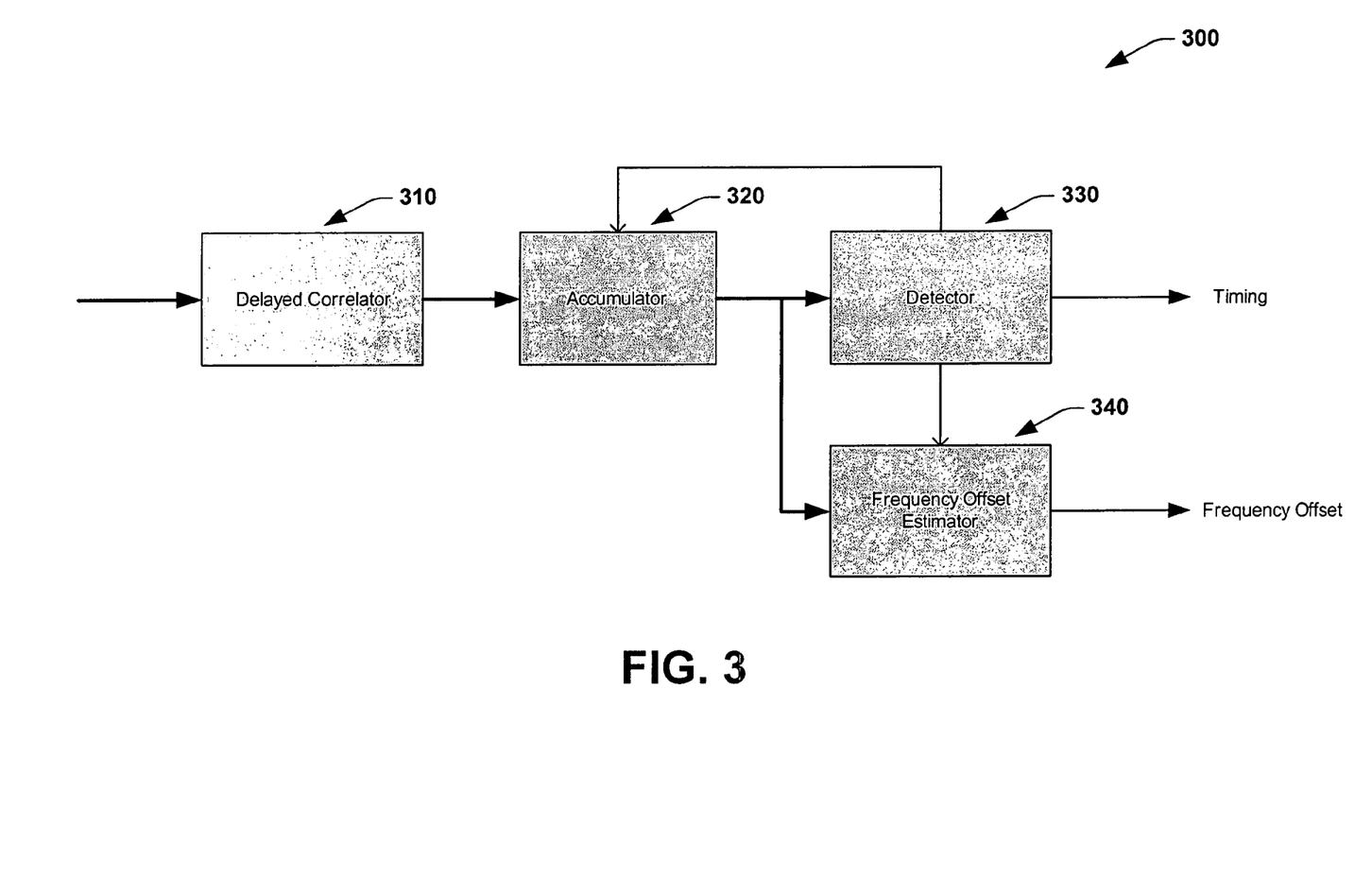
FIG. 3 illustrates an example matched filter configuration.

FIG. 3 illustrates an example matched filter configuration 300. As illustrated, the filter 300 includes a delayed correlator 310 that feeds a complex accumulator 320 which processes complex data having real and imaginary components. A detector 330 and a frequency offset estimator 340 determine timing and frequency information respectively. The configuration 300 provides an efficient embodiment for a respective matched filter approach. The complex output of the delayed correlator 310 is passed to the complex accumulator 320. Generally, the accumulator 320 only accumulates samples up to length T. When a new output sample is received, the oldest sample is removed from the accumulator 320. The magnitude of the accumulator output is saved by the detector 330. When P seconds worth of magnitude values are collected by the detector 330, a circular search for the maximum value of the collected values is performed. The time position corresponding to the maximum is then obtained, where system timing is then established. The accumulator 320 starts accumulating delayed correlator 310 output when the next pilot occurs and stops accumulating when the pilot ends. The output of the accumulator 320 is then used for the frequency offset estimation at 340.

Figure 4:
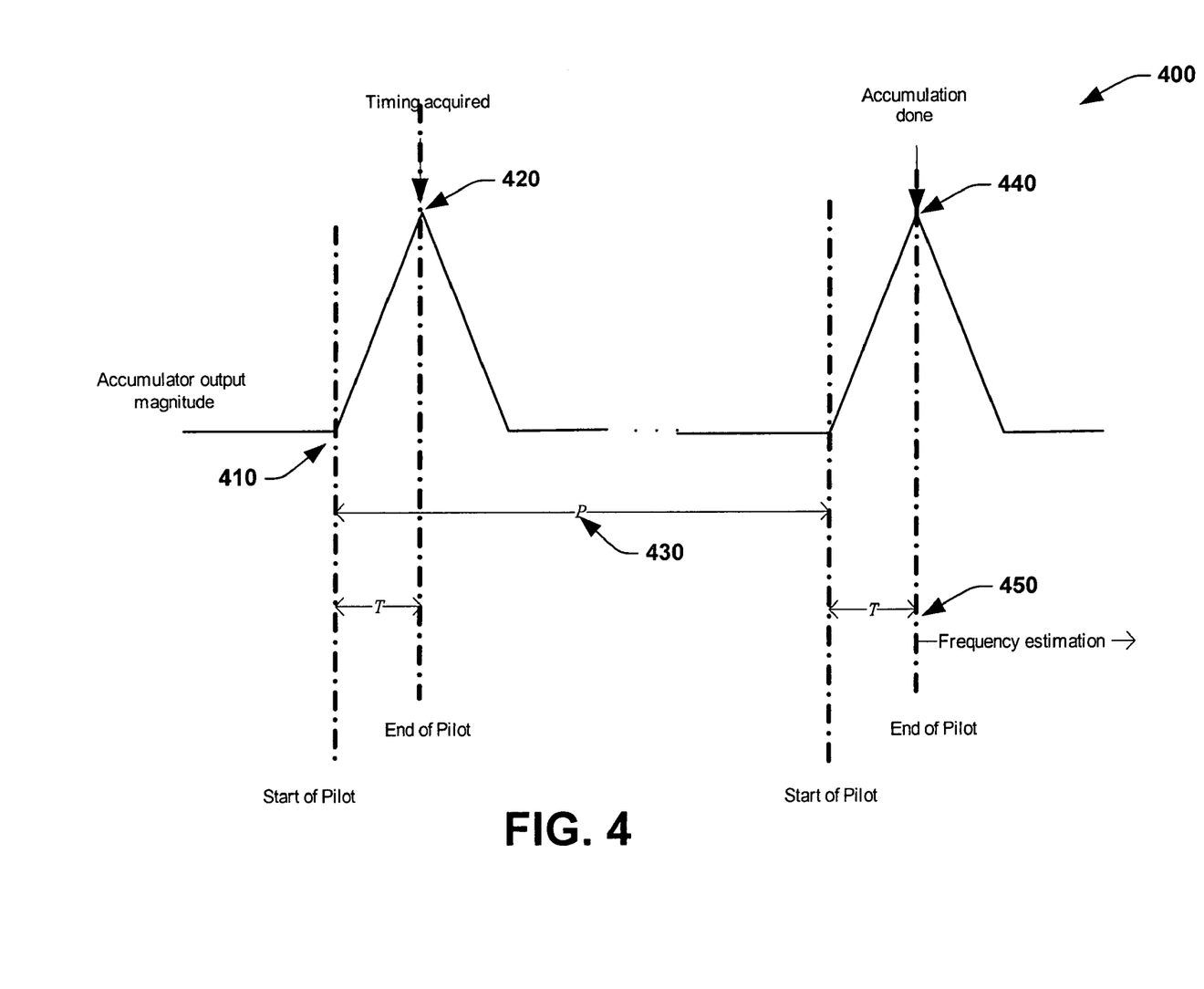
FIG. 4 illustrates and example acquisition sequence.

FIG. 4 illustrates an example acquisition sequence. As illustrated, a start of pilot acquisition is shown at 410, where timing is then acquired at 420 after a peak magnitude value has been detected in an accumulator. This peak 420 should be the only peak detected during period P shown at 430. Proceeding to 440, magnitude accumulation is completed, where frequency estimation begins at 450.

Figure 5:
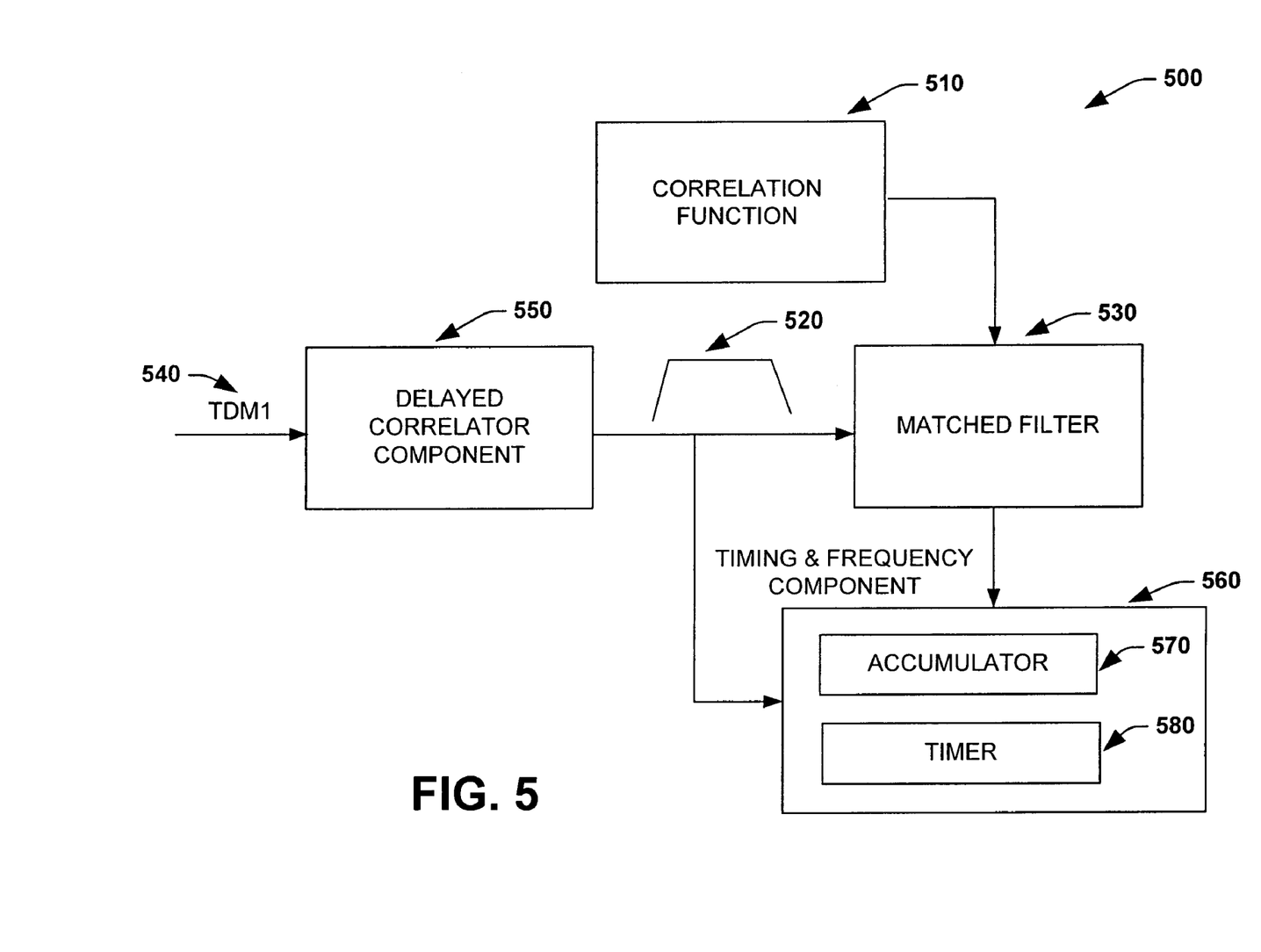
FIG. 5 is illustrates an alternative correlation processing system.
Figure 6:
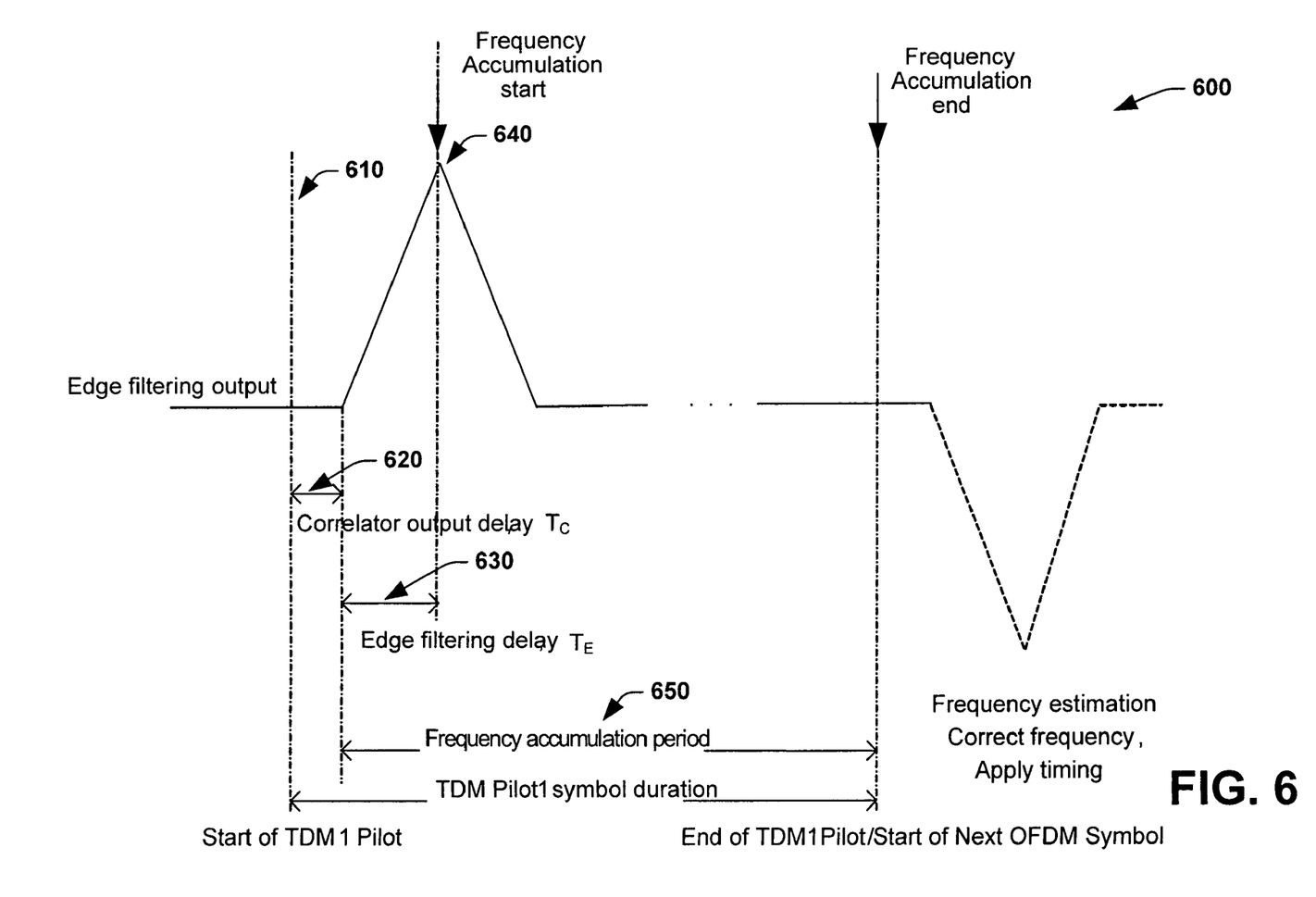
FIG. 6 illustrates an alternative timing diagram for a correlation processing system.

FIGS. 5 and 6 illustrate an alternative embodiment where correlations are determined over the period of a superframe. A system 500 includes a correlation function 510 and a delayed correlator output 520 that are applied to a matched filter 530. As shown, a TDM1 pilot 540 is processed by a delayed correlator component 550 to generate the delayed correlator output 520 which is supplied to the matched filter 530. At 560, a timing and frequency component employs a frequency accumulator 570 (or accumulator) and a timer 580 to determine timing and frequency estimates for a wireless receiver, where FIG. 6 illustrates an example timing diagram 600 for the system 500. A template is employed at 510 to filter the correlation output of the TDM Pilot 1 540. The delayed correlator output 530 is buffered with length of $T_E/2$ via accumulator 570. When the matched filter 530 output exceeds a predetermined threshold, the accumulator 570 starts to accumulate the correlator output 520 and the timer 580 starts timing. If the matched filter 530 output exceeds the previous detected value, both the accumulator 570 and timer 580 are reset and restart. When the timer 580 finally expires, the frequency accumulator 570 stops. The frequency estimate is then calculated based on the value in the accumulator 570 and applied to correct the frequency offset in the wireless receiver. The OFDM symbol boundary can also be determined for the next OFDM symbol processing.

Referring briefly to FIG. 6, reference numeral 610 indicates the start of a TDM1 pilot signal. At 620, a correlator output delay $T_C$ is illustrated and an edge filtering delay $T_E$ is illustrated at 630. At 640, frequency accumulation start is indicated and continues during a frequency acquisition period which is generally the period of the TDM1 pilot symbol. As noted previously, the embodiments disclosed herein can employ matched edge detectors which sample the output of TDM Pilot 1 waveform correlation data instead of applying a fixed threshold directly on the TDM Pilot 1 waveform correlation data, thus providing more noise and interference variation resistance and improved accuracy. This improved timing accuracy also improves the frequency acquisition accuracy. In an aspect, the AFC loop in the receiver can be opened (accumulation only, no correction) during TDM Pilot I detection period. This mitigates disturbances to the correlation estimation and greatly improves the frequency estimation accuracy.

Figure 7:
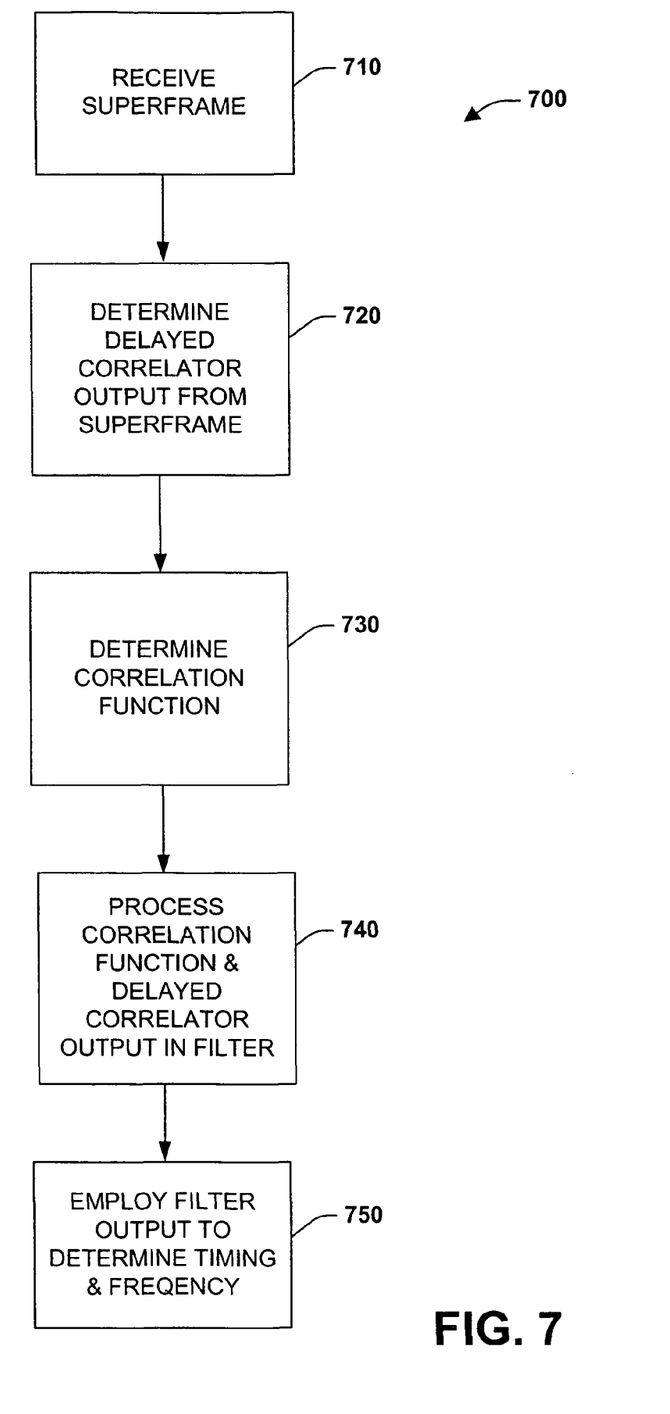
FIG. 7 is a flow diagram illustrating example processing for time domain multiplexing pilot signals.

FIG. 7 illustrates an example process 700 for determining frequency and timing from time division multiplexing pilot signals. While, for purposes of simplicity of explanation, the methodology is shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Proceeding to 710, a superframe is received at a wireless receiver. The superframe could include substantially any type of OFDM data packet that employs a TDM1 pilot symbol to allow timing and frequency corrections at the receiver. At 720, a delayed correlator output is determined from the superframe of 710. As noted above, such output is a general rectangular structure. In previous systems, such delayed correlator output was compared directly to a threshold which suffered from noise problems at or near the threshold. In the embodiments disclosed herein a correlation function is determined at 730, where the correlation function and the delayed correlator output are applied to a filter at 740. At the filter, processing includes determining peak magnitudes in a complex accumulator. After determining the peak, pilot timing information can be ascertained. Alternatively, output from the filter may appear as a triangular waveform that can be employed for peak detection to determine the start of TDM1. Such peak detection could include applying a threshold to the filter output however peak detection circuits or components may also be employed. At 750, after the detected start of TDM1, the filter output is employed to synchronize timing with the transmitter and to determine frequency considerations for the receiver. Such frequency can be determined between the start of a given TDM1 and a subsequent TDM1 in another received superframe. As noted above, knowledge of superframe structure can be employed to mitigate delays in processing at the end of a superframe period by performing known timing and frequency calculations from the start of the detected TDM1 as determined from the filter output.

Figure 8:
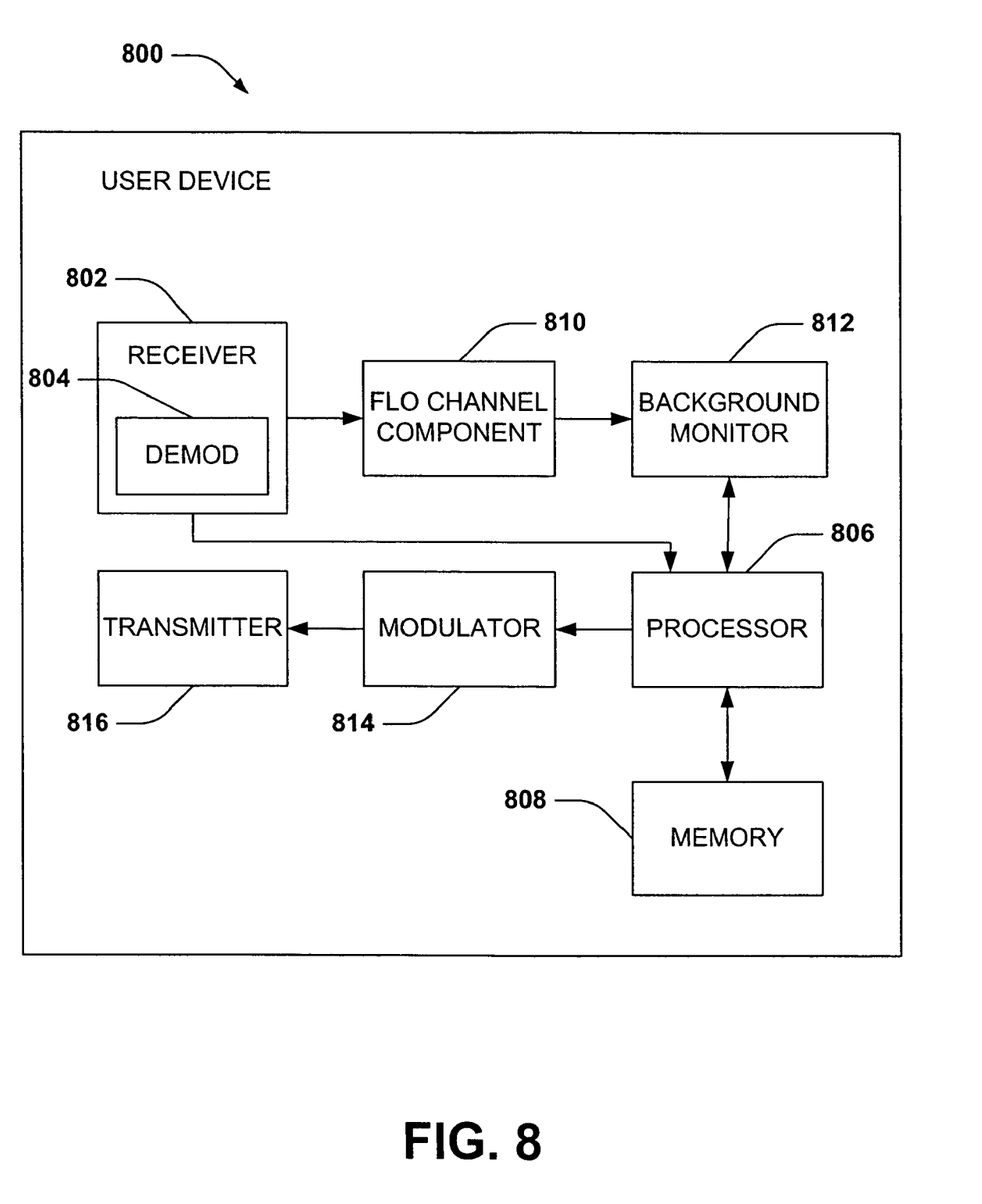
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. Receiver 802 can be a nonlinear receiver. A demodulator 804 can demodulate and provide received pilot symbols to a processor 806 for channel estimation. A FLO channel component 810 is provided to process FLO signals. This can include digital stream processing and/or positioning location calculations among other processes. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800. A memory may also be provided to facilitate processor execution. It is noted that the device 800 is exemplary in nature and intended to convey general functionality. With respect to forward link only (FLO) functionality, the FLO stream can co-exist with a wireless device such as a phone but is essentially independent of normal device transmit and receive operations. Hence, a FLO channel would not employ the transmitter 816.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 814 for processing FLO data, a symbol modulator 814 and a transmitter 816 that transmits the modulated signal.

It is noted that a Forward Link Only (FLO) air interface covers protocols and services corresponding to OSI6 having Layers 1 (physical layer) and Layer 2 (Data Link layer). The Data Link layer is further subdivided into two sub-layers, namely, Medium Access (MAC) sub-layer, and Stream sub-layer. Upper Layers can include compression of multimedia content, access control to multimedia, along with content and formatting of control information.

The FLO air interface specification typically does not specify the upper layers to allow for design flexibility in support of various applications and services. These layers are shown to provide context. The Stream Layer includes multiplexes up to three upper layer flows into one logical channel, binding of upper layer packets to streams for each logical channel, and provides packetization and residual error handling functions. Features of the Medium Access Control (MAC) Layer includes controls access to the physical layer, performs the mapping between logical channels and physical channels, multiplexes logical channels for transmission over the physical channel, de-multiplexes logical channels at the mobile device, and/or enforces Quality of Service (QOS) requirements. Features of Physical Layer include providing channel structure for the forward link, and defining frequency, modulation, and encoding requirements.

The FLO physical layer uses a 4K mode (yielding a transform size of 4096 sub-carriers), providing superior mobile performance compared to an 8K mode, while retaining a sufficiently long guard interval that is useful in fairly large SFN cells. Rapid channel acquisition can be achieved through an optimized pilot and interleaver structure design. The interleaving schemes incorporated in the FLO air interface facilitate time diversity. The pilot structure and interleaver designs optimize channel utilization without annoying the user with long acquisition times. Generally, FLO transmitted signals are organized into super frames. Each super frame is comprised of four frames of data, including TDM pilots (Time Division Multiplexed), Overhead Information Symbols (OIS) and frames containing wide-area and local-area data. The TDM pilots are provided to allow for rapid acquisition of the OIS. The OIS describes the location of the data for each media service in the super frame.

Typically, each super frame consists of 200 OFDM symbols per MHz of allocated bandwidth (1200 symbols for 6 MHz), and each symbol contains 7 interlaces of active sub-carriers. Each interlace is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Figure 9:
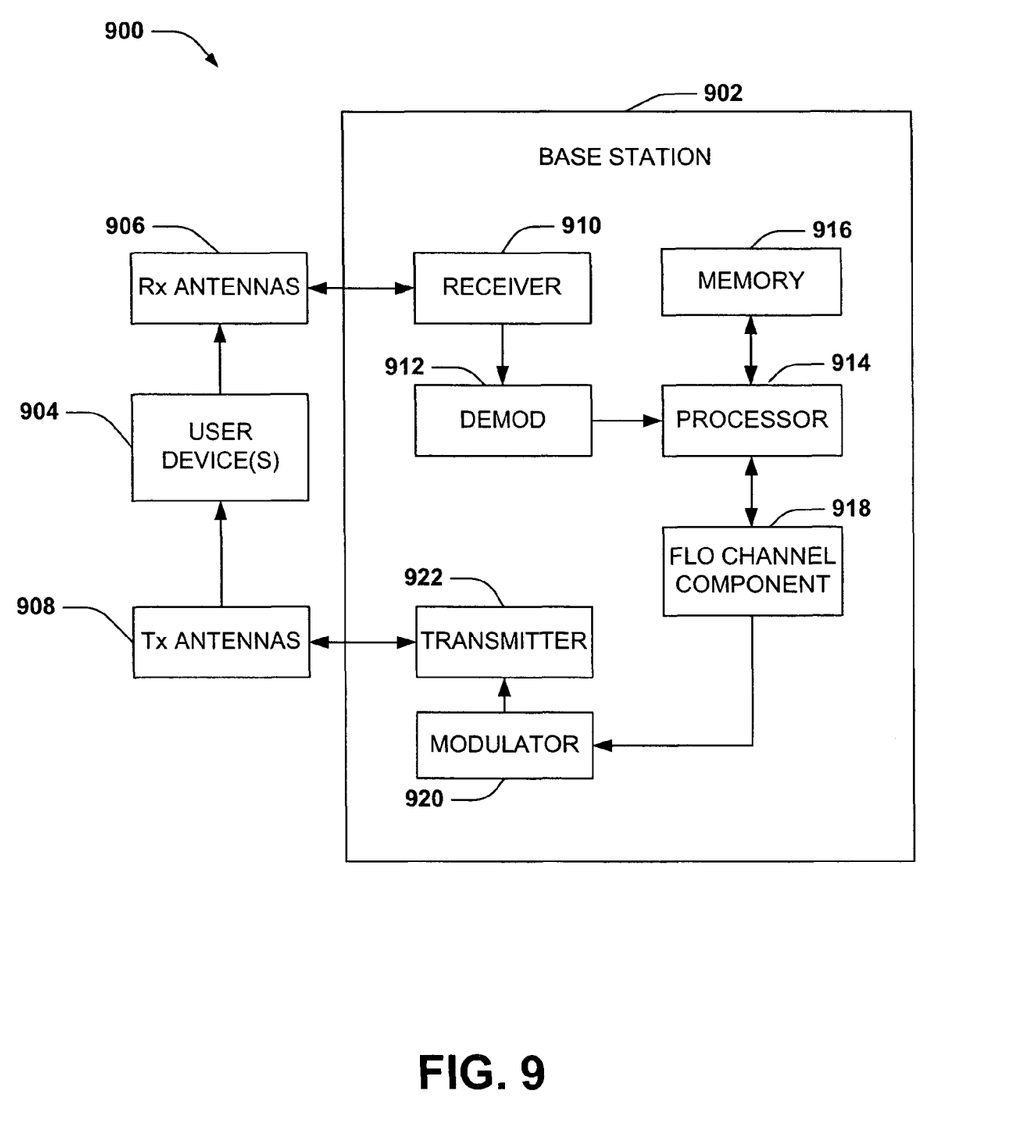
FIG. 9 is a diagram illustrating an example base station for a wireless system.

FIG. 9 is an illustrates an example system 900 that comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor, and which is coupled to a memory 916 that stores information related to user ranks, lookup tables related thereto, and/or any other suitable information related to performing the various actions and functions set forth herein. Processor 914 is further coupled to a FLO channel 918 component that facilitates sending FLO information to one or more respective user devices 904. A modulator 922 can multiplex a signal for transmission by a transmitter 924 through transmit antenna 908 to user devices 904.

Figure 10:
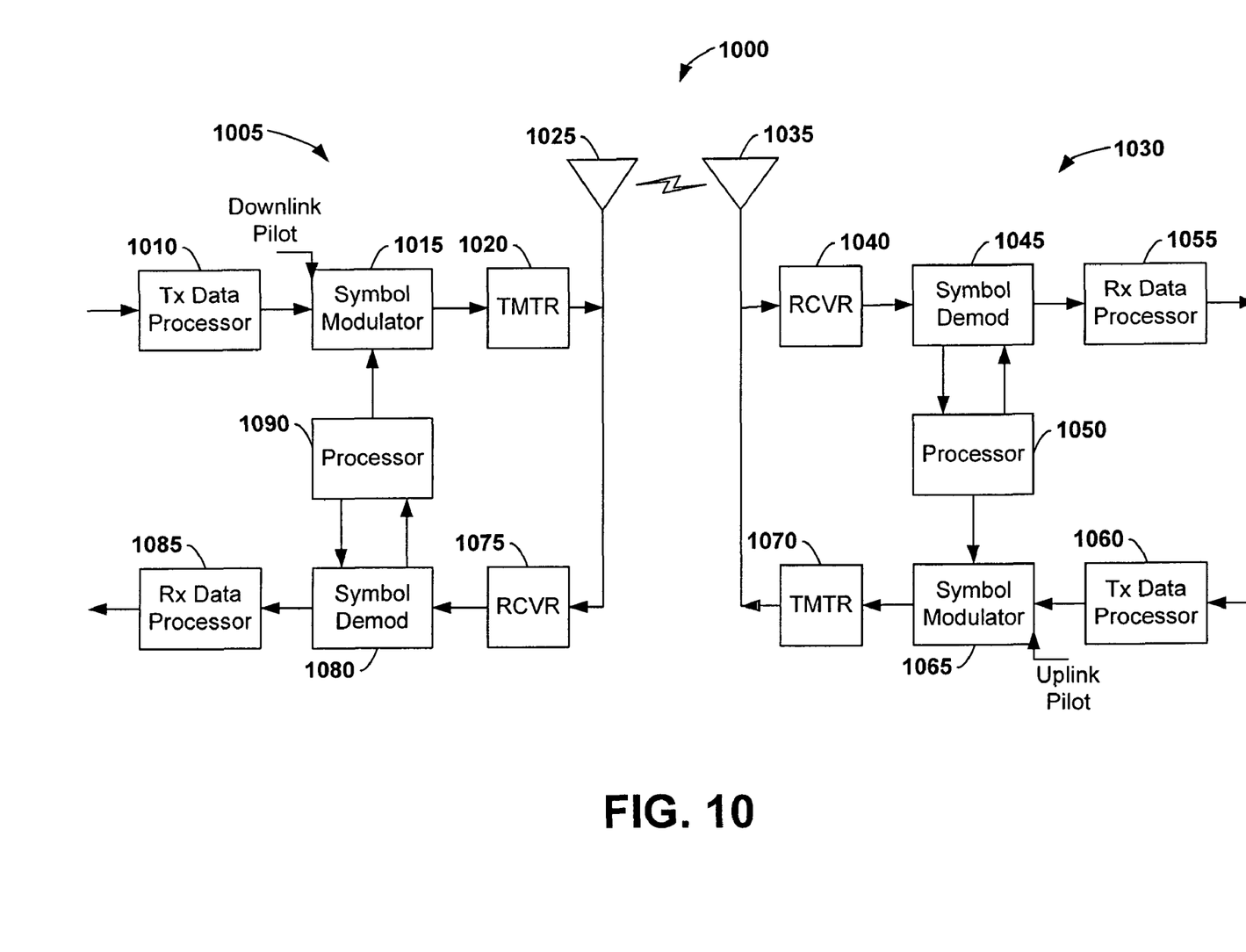
FIG. 10 is a diagram illustrating an example transceiver for a wireless system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

Systems and devices described herein may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for timing acquisition in a wireless network, comprising:
   acquiring samples from an Orthogonal Frequency Division Multiplexing (OFDM) data packet broadcast over a predetermined period of time, wherein the samples include a Time Division Multiplexing (TDM) pilot symbol;
   processing the samples to determine a maximum value that indicates the TDM pilot symbol has been detected; and
   employing a template that matches an ideal delayed correlation function of the TDM pilot symbol to facilitate determining the maximum value.

2. The method of claim of claim 1, further comprising determining timing or frequency information from the maximum value.

3. The method of claim 1, further comprising processing a superframe to determine a correlation output.

4. The method of claim 3, wherein the superframe is transmitted in an Orthogonal Frequency Division Multiplexing (OFDM) network.

5. The method of claim 1, further comprising storing magnitude information collected from a superframe.

6. The method of claim 5, wherein the magnitude information includes real and imaginary components.

7. The method of claim 6, wherein the magnitude information is processed in a matched filter to determine magnitude values.

8. The method of claim 7, further comprising processing the magnitude values over a predetermined time frame.

9. The method of claim 8, further comprising determining a peak value in a buffer that indicates a received pilot symbol.

10. The method of claim 9, further comprising employing the peak value to determine timing and frequency offsets for a wireless receiver.

11. The method of claim 10, further comprising employing a delayed correlator with delay τ to detect a periodicity in a received symbol set.

12. The method of claim 11, further comprising employing a user function to select timing and frequency methods.

13. A receiver, comprising:
    a receiver circuit configured to acquire samples from an Orthogonal Frequency Division Multiplexing (OFDM) data packet broadcast over a predetermined period of time, wherein the samples include a Time Division Multiplexing (TDM) pilot symbol; and
    a processor circuit coupled to the receiver circuit and configured to perform operations comprising,
        processing the samples to determine a maximum value that indicates the TDM pilot symbol has been detected, and
        employing a template that matches an ideal delayed correlation function of the TDM pilot symbol to facilitate determining the maximum value.

14. The receiver of claim of claim 13, wherein the processor circuit is configured to perform operations further comprising determining timing or frequency information from the maximum value.

15. The receiver of claim 13, wherein the processor circuit is configured to perform operations further comprising processing a superframe to determine a correlation output.

16. The receiver of claim 15, wherein the superframe is transmitted in an Orthogonal Frequency Division Multiplexing (OFDM) network.

17. The receiver of claim 16, wherein the processor circuit is configured to perform operations further comprising storing magnitude information collected from a superframe.

18. The receiver of claim 17, wherein the magnitude information includes real and imaginary components.

19. The receiver of claim 18, wherein the magnitude information is processed in a matched filter to determine magnitude values.

20. The receiver of claim 19, wherein the processor circuit is configured to perform operations further comprising processing the magnitude values over a predetermined time frame.

21. The receiver of claim 20, wherein the processor circuit is configured to perform operations further comprising determining a peak value in a buffer that indicates a received pilot symbol.

22. The receiver of claim 21, wherein the processor circuit is configured to perform operations further comprising employing the peak value to determine timing and frequency offsets for a wireless receiver.

23. The receiver of claim 22, wherein the processor circuit is configured to perform operations further comprising employing a delayed correlator with delay τ to detect a periodicity in a received symbol set.

24. The receiver of claim 23, wherein the processor circuit is configured to perform operations further comprising employing a user function to select timing and frequency methods.

25. A receiver, comprising:
    means for acquiring samples from an Orthogonal Frequency Division Multiplexing (OFDM) data packet broadcast over a predetermined period of time, wherein the samples include a Time Division Multiplexing (TDM) pilot symbol;
    means for processing the samples to determine a maximum value that indicates the TDM pilot symbol has been detected; and
    means for employing a template that matches an ideal delayed correlation function of the TDM pilot symbol to facilitate determining the maximum value.

26. The receiver of claim of claim 25, further comprising means for determining timing or frequency information from the maximum value.

27. The receiver of claim 25, further comprising means for processing a superframe to determine a correlation output.

28. The receiver of claim 27, wherein the superframe is transmitted in an Orthogonal Frequency Division Multiplexing (OFDM) network.

29. The receiver of claim 25, further comprising means for storing magnitude information collected from a superframe.

30. The receiver of claim 29, wherein the magnitude information includes real and imaginary components.

31. The receiver of claim 30, further comprising means for processing the magnitude information in a matched filter to determine magnitude values.

32. The receiver of claim 31, further comprising means for processing the magnitude values over a predetermined time frame.

33. The receiver of claim 32, further comprising means for determining a peak value in a buffer that indicates a received pilot symbol.

34. The receiver of claim 33, further comprising means for employing the peak value to determine timing and frequency offsets for a wireless receiver.

35. The receiver of claim 34, further comprising means for employing a delayed correlator with delay τ to detect a periodicity in a received symbol set.

36. The receiver of claim 35, further comprising means for employing a user function to select timing and frequency methods.

37. A non-transitory processor-readable storage medium having stored thereon processor-executable instructions, comprising:
    at least one instruction for acquiring samples from an Orthogonal Frequency Division Multiplexing (OFDM) data packet broadcast over a predetermined period of time, where the samples include a Time Division Multiplexing (TDM) pilot symbol;
    at least one instruction for processing the samples to determine a maximum value that indicates the TDM pilot symbol has been detected; and
    at least one instruction for employing a template that matches an ideal delayed correlation function of the TDM pilot symbol to facilitate determining the maximum value.

38. The non-transitory processor-readable storage medium of claim of claim 37, wherein the stored processor-executable further comprises at least one instruction for determining timing or frequency information from the maximum value.

39. The non-transitory processor-readable storage medium of claim 37, wherein the stored processor-executable further comprises at least one instruction for processing a superframe to determine a correlation output.

40. The non-transitory processor-readable storage medium of claim 39, wherein the superframe is transmitted in an Orthogonal Frequency Division Multiplexing (OFDM) network.

41. The non-transitory processor-readable storage medium of claim 37, wherein the stored processor-executable further comprises at least one instruction for storing magnitude information collected from a superframe.

42. The non-transitory processor-readable storage medium of claim 41, wherein the magnitude information includes real and imaginary components.

43. The non-transitory processor-readable storage medium of claim 42, wherein the stored processor-executable further comprises at least one instruction for processing the magnitude information in a matched filter to determine magnitude values.

44. The non-transitory processor-readable storage medium of claim 43, wherein the stored processor-executable further comprises at least one instruction for processing the magnitude values over a predetermined time frame.

45. The non-transitory processor-readable storage medium of claim 44, wherein the stored processor-executable further comprises at least one instruction for determining a peak value in a buffer that indicates a received pilot symbol.

46. The non-transitory processor-readable storage medium of claim 45, wherein the stored processor-executable further comprises at least one instruction for employing the peak value to determine timing and frequency offsets for a wireless receiver.

47. The non-transitory processor-readable storage medium of claim 46, wherein the stored processor-executable further comprises at least one instruction for employing a delayed correlator with delay $\tau$ to detect a periodicity in a received symbol set.

48. The non-transitory processor-readable storage medium of claim 47, wherein the stored processor-executable further comprises at least one instruction for employing a user function to select timing and frequency methods.

* * * * *